United States Patent [19]

Moore et al.

[11] Patent Number: 4,478,029
[45] Date of Patent: Oct. 23, 1984

[54] MOWER BLADE SPINDLE ASSEMBLY

[75] Inventors: James W. Moore, Beaver Dam; Lee J. Wanie, Horicon, both of Wis.

[73] Assignee: Deere & Company, Moline, Ill.

[21] Appl. No.: 503,973

[22] Filed: Jun. 13, 1983

[51] Int. Cl.³ .......................................... A01D 55/18
[52] U.S. Cl. ...................................... 56/17.5; 56/255; 56/295
[58] Field of Search ................ 56/17.5, 503, 235, 255, 56/256, 295, DIG. 20; 301/126, 131, 132

[56] References Cited
U.S. PATENT DOCUMENTS

| 3,416,295 | 12/1968 | Kaufman | 56/17.5 |
| 3,731,472 | 5/1973 | Kamlukin | 56/17.5 |
| 3,890,773 | 6/1975 | Frost | 56/255 |
| 3,897,678 | 8/1975 | Zurek et al. | 56/17.5 |

FOREIGN PATENT DOCUMENTS 208789  6/1957  Australia .............................. 56/17.5

*Primary Examiner*—Gene Mancene
*Assistant Examiner*—John G. Weiss

[57]  ABSTRACT

A mower blade spindle assembly includes a drive shaft having a hub received on threaded end of the shaft. The shaft is tapered from the root diameter of the last thread and the hub is correspondingly tapered so as to provide a thread relief. The end of the shaft on which the hub is received has a threaded bore extending axially therein for receiving a blade mounting bolt. The bore is counterbored to a depth corresponding to the length of the threaded portion receiving the hub.

3 Claims, 1 Drawing Figure

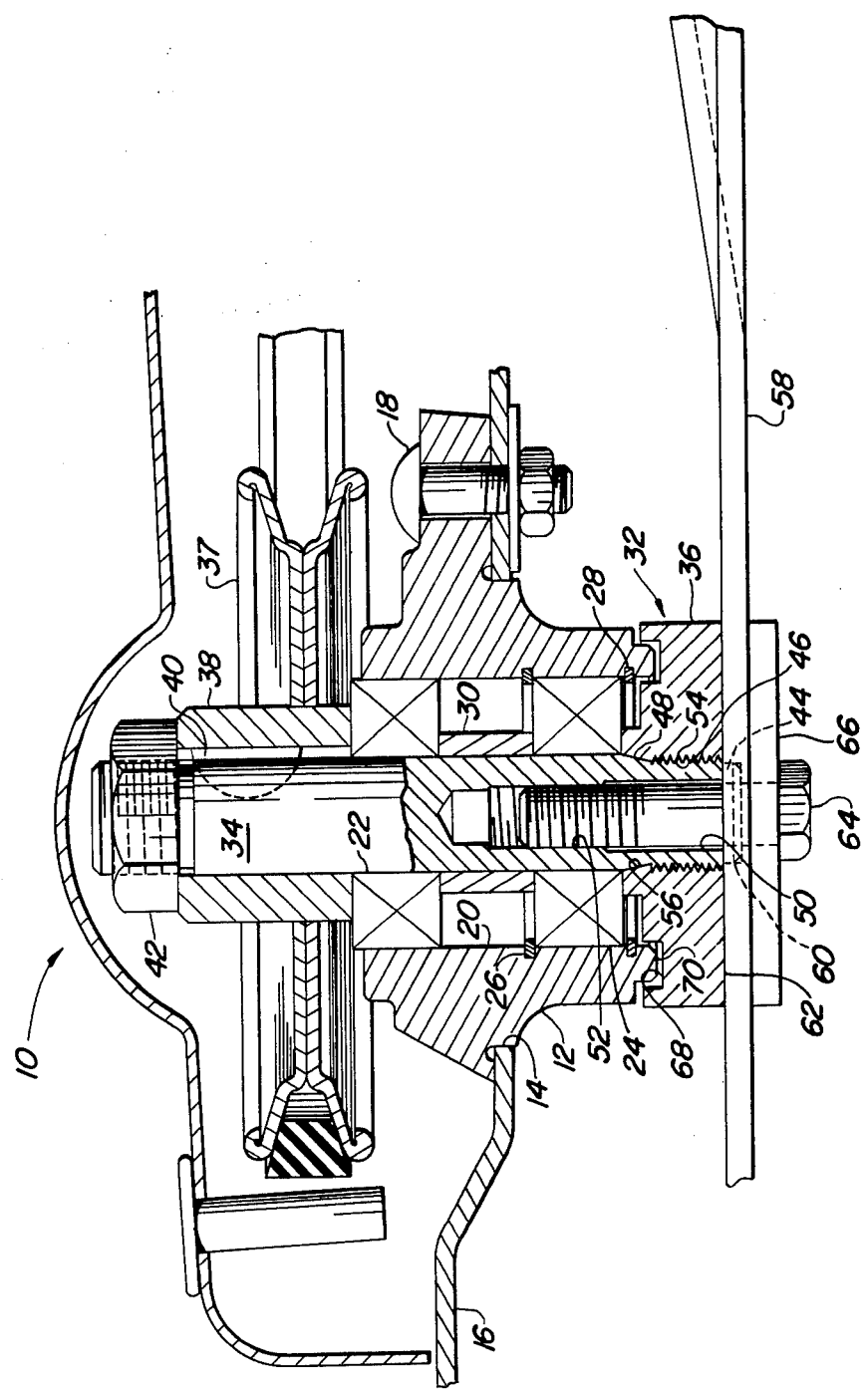

4,478,029

MOWER BLADE SPINDLE ASSEMBLY

BACKGROUND OF THE INVENTION

The present invention relates to rotary mowers and more specifically relates to blade drive spindles for such mowers.

The spindle assemblies dealt with here include a shaft having a hub integral with or somehow secured to one end thereof. There are a variety of spindle assemblies of this type, however, either their energy absorbing ability is not such as to preclude part breakage, the coming off of parts or undue support bearing loads resulting in early failure, when the blade impacts fixed objects or their cost of manufacture is to much.

One known design, for example, employs a shaft having a threaded end on which a hub is received. An annular thread relief recess is provided in the shaft at the end of the threads receiving the hub. A threaded axial bore is provided in the end of the shaft for receiving a blade mounting bolt which operates against a spring washer for snubbing a blade tightly against the hub. In this design, impact loading of the spindle causes it to break at the recess in the shaft.

Another known design overcomes the drawback of the design just mentioned by eliminating the threads and thread recess at the end of the shaft and instead securing the hub to the shaft by welding. This design is too expensive, however, since it requires various surfaces of the hub and shaft to be remachined to the correct dimensions after the welding operation.

In another known design, the shaft is solid and the hub is keyed to the end of the shaft. This design too is strong enough to withstand impact loading without breakage, but, because it is loaded beyond its bearing support, it is easily bent and the bearings are subject to early failure.

SUMMARY OF THE INVENTION

According to the present invention, there is provided an improved rotary mower spindle assembly.

An object of the invention is to provide a cost effective spindle assembly which is capable of absorbing impact loads without breakage or parts coming loose therefrom and without undue loading being imposed on the bearings supporting the assembly.

This and other objects are realized by a spindle assembly comprising a shaft having a threaded end on which is received a hub. Extending from the root of the last thread of the threaded end is a tapered section which provides relief for the hub threads without creating a stress riser. A bore extends axially into the shaft and includes a threaded section located below a counterbore which extends to a depth which is greater than the distance of the tapered section from the end of the shaft. The bore is adapted for receiving a blade mounting bolt and the shaft is adapted for reception in support bearings such that the bolt and bore threads are within the bearing support.

BRIEF DESCRIPTION OF THE DRAWING

The sole FIGURE is a vertical sectional view showing a spindle assembly constructed in accordance with the present invention and embodied in a rotary mower drive mounting.

DESCRIPTION OF THE PREFERRED EMBODIMENT

Referring now to the drawing, there is shown a portion of a rotary mower drive 10. The drive 10 includes a bearing housing 12 fixed within a circular opening 14 provided in a top wall portion of a blade housing 16 by a plurality of bolts 18 (only one shown) received in aligned holes provided in the housings 12 and 16. The bearing housing 12 is provided with a central vertical bore 20 in which upper and lower shaft support bearings 22 and 24, respectively, are received. The lower bearing 24 is held in place by upper and lower snap rings 26 and 28, and a spacer 30 keeps the bearings a preselected distance apart.

A spindle assembly 32 comprising a shaft 34 and a hub 36 is rotatably supported in the bearing housing by the bearings 22 and 24. Specifically, the shaft 34 is received within the bearings 22 and 24 with its upper end projecting beyond the upper bearing 22. A drive pulley 37 has a hub 38 received on the upper end portion of the shaft 34 and keyed thereto by a half-moon key 40. The hub 38 rests on the upper bearing 22 and is held in place by a nut 42 received on the shaft 34. The shaft 34 has a short lower end portion forming a blade pilot 44, and following the pilot is a threaded section 46 which in turn is followed by a tapered thread relief section 48 joining the root of the last thread of the section 46 with the outside diameter of the shaft. The relief section 48 terminates at the lower bearing 24. The lower end of the shaft 34 is provided with an axial bore including a counterbore 50 extending to a depth which is slightly greater than the distance from the lower end of the shaft to the upper end of the relief section 48. The counterbore 50 is followed by a threaded bore section 52 which is located entirely above the lower end of the lower bearing 24. The spindle hub 36 is cylindrical and includes a central threaded bore 54 having a tapered upper end portion 56 shaped complementary to the thread relief section 48. The hub 36 is threadedly received on the lower end portion of the shaft 34, with the tapered end portion 56 of the hub bore 54 being received about the thread relief section.

The blade pilot 44 of the shaft 34 is located below the hub 36. A mower blade 58 has a bore located centrally between the ends thereof and is counterbored, as at 60, so as to form a pilot receptacle which receives the blade pilot 44. The blade 58 is held in tight frictional engagement with a flat bottom surface 62 of the hub 36 by a blade mounting bolt 64 threadedly received in the threaded bore section 52 and acting through a spring washer 66 located between a head of the bolt and the spindle hub. The upper surface of the hub 36 is provided with an annular recess 68 which receives an annular projection 70 at the lower end of the bearing housing 12 so as to form a labyrinth for impeding material from entering into the bearing housing.

In operation, the tapered thread relief section 48 on the shaft 34 provides relief for the threads of the hub 36 but does not form a stress riser as does the annular recess provided for stress relief in the aforedescribed known design. Further, the relief section 48 acts to prevent the threads of the hub 36 from being stripped out in the event that the hub-to-shaft connection is over torqued during assembly. Upon the spindle assembly 32 becoming impact loaded due to the blade 58 striking a fixed obstacle, energy is absorbed through elongation of the bolt 64, as is made possible by the unthreaded length of the bolt and further energy is absorbed through elongation of the shaft 34 which occurs due to the fact that the bolt is secured to the shaft in a zone beyond the critical area of the hub-to-shaft connection.

We claim:

1. In a rotary mower drive assembly including a vertical shaft journalled for rotation in a bearing housing with a drive pulley being mounted on the shaft above the housing and a hub being fixed to the shaft below the housing, and a mower blade being held in tight frictional engagement with a bottom surface of the hub by a blade mounting bold extending through the blade and threadedly received in a threaded bore section extending axially into a lower end of the shaft, an improved spindle assembly comprised of the shaft and hub, comprising: said shaft having a threaded exterior located adjacent said lower end; said hub having a threaded central bore received on said threaded exterior of the shaft; said shaft including a tapered thread relief section commencing at an upper end of the threaded exterior thereof; said central bore of said hub including a tapered end portion received on and shaped complementary to the thread relief section; a bore extending axially into the lower end of the shaft and said threaded bore section forming a sole threaded portion of the last-mentioned bore and being located in the shaft entirely above the threaded exterior of the shaft and within the bearing housing.

2. A high impact spindle assembly, comprising: a shaft having an end; said shaft being provided exteriorly with a tapered thread relief spaced from said end and a threaded section extending from the relief to a location adjacent said end; a hub having a central threaded bore received on said threaded section of said shaft and including a tapered section shaped complementary to and received on the tapered thread relief; a bore extending axially into said shaft from said end and including a sole threaded section spaced from said end a distance greater than said relief is spaced and adapted for receiving a blade mounting bolt.

3. In a rotary mower drive assembly including a bearing housing having a vertical bore therethrough, bearing means mounted in said bore, a drive shaft received in the bearing means, a drive member fixed to the shaft at a location above the bearing means; said shaft having a threaded exterior located below said bearing means, a hub having a central threaded bore received on said threaded exterior of the shaft, a blade positioned against a bottom surface of the hub and having a mounting hole aligned with the bore therein, a bore extending axially into the shaft from a lower end thereof, and including a single threaded section, a washer located beneath the blade and a blade mounting bolt received in the washer and blade and being threaded into the threaded section of the bore such as to hold the blade in tight frictional engagement with the hub, the improvement comprising: said threaded section of the bore being spaced from the lower end of the shaft a distance greater than which the threaded exterior of the shaft is located and said threaded section being entirely within the bearing means; said central threaded bore including an upwardly and outwardly tapered upper end portion; and said shaft including a tapered thread relief portion extending upwardly to the bearing means from the threaded exterior of the shaft and being tapered complementary to and received in the tapered upper end portion of the bore in said hub.

* * * * *